United States Patent [19]
Meier

[11] 3,897,589
[45] July 29, 1975

[54] FAST CURING, WATER-RESISTANT LAMINATE MADE WITH ACCELERATED MELAMINE-ALDEHYDE RESIN AND ACCELERATED PHENOL-ALDEHYDE RESIN AND METHOD OF MAKING IT

[75] Inventor: Joseph F. Meier, Export, Pa.
[73] Assignee: Westinghouse Electric Corporation, Pittsburgh, Pa.
[22] Filed: May 24, 1973
[21] Appl. No.: 363,774

[52] U.S. Cl. ............... 428/525; 156/278; 156/300; 156/335; 260/29.3; 260/59 R; 428/531
[51] Int. Cl.² ... B32B 27/04; B32B 27/42; B32B 31/12
[58] Field of Search ................... 156/278, 300, 335; 161/258, 264, 413; 260/29.3, 59 R

[56] References Cited
UNITED STATES PATENTS

| | | | |
|---|---|---|---|
| 1,944,143 | 1/1934 | Bender | 161/258 |
| 2,218,373 | 10/1940 | Alexander | 156/335 |
| 2,801,198 | 7/1957 | Morris et al. | 161/258 X |
| 2,940,954 | 6/1960 | Barr et al. | 260/59 |

FOREIGN PATENTS OR APPLICATIONS

| | | | |
|---|---|---|---|
| 962,869 | 7/1964 | United Kingdom | 161/258 |

*Primary Examiner*—Charles E. Van Horn
*Assistant Examiner*—Robert A. Dawson
*Attorney, Agent, or Firm*—R. D. Fuerle

[57] ABSTRACT

A laminate and a method of making it are disclosed. The laminate is made with a phenol-aldehyde resin composition containing a water-soluble carbonate or bicarbonate catalyst, the presence of which accelerates the cure time of the resin. A substrate is coated with the composition, stacked with at least one sheet of substrate coated with an accelerated melamine-aldehyde resin and cured. The resulting laminate is not only made in less time than an unaccelerated control but also exhibits superior water-boil resistance.

10 Claims, 3 Drawing Figures

FAST CURING, WATER-RESISTANT LAMINATE MADE WITH ACCELERATED MELAMINE-ALDEHYDE RESIN AND ACCELERATED PHENOL-ALDEHYDE RESIN AND METHOD OF MAKING IT

BACKGROUND OF THE INVENTION

A typical laminate consists of a core stock of about seven sheets of phenol-formaldehyde impregnated paper, a print sheet of melamine-formaldehyde impregnated paper, and an overlay sheet of melamine-formaldehyde impregnated paper. A stack, consisting of a number of laminates separated by metal spacers and release paper, is cured in a large, heated press for about 40–70 minutes. The amount of time that a stack must stay in the press in order to fully cure both the phenol-formaldehyde resin and the melamine-formaldehyde resin determines how many press-loads of laminates can be produced per day.

In my copending application, Ser. No. 363,775 titled "ACCELERATED MELAMINE-ALDEHYDE RESIN AND METHOD OF MAKING A FAST-CURING LAMINATE THEREWITH," filed of even date and incorporated herein by reference, is described an accelerated melamine-aldehyde resin which contains about 0.001 to about 2% (based on resin solids) of a free-radical generator, preferably a water soluble peroxide, hydroperoxide, or persulfate. That accelerated resin cures faster than the presently used sodium hydroxide-catalyzed phenolformaldehyde resins. Thus, the cure time for a laminate is controlled by rate of cure of the phenol-aldehyde resin and can be reduced if the cure time of the phenol-aldehyde resin is reduced.

DESCRIPTION OF THE PRIOR ART

U.S. Pat. Nos. 1,944,143 and 2,218,373 disclose the use of sodium carbonate as a catalyst in curing phenol-formaldehyde resins.

U.S. Pat. No. 3,042,655 discloses the use of sodium carbonate as a catalyst in curing novolac resins.

U.S. Pat. No. 3,448,079 discloses the use of sodium carbonate as a condensing agent in preparing phenolic resins.

U.S. Pat. No. 2,801,198 discloses the preparation of a laminate where the cure of one phenol-formaldehyde resin in a blend of resins is catalyzed with sodium carbonate.

SUMMARY OF THE INVENTION

I have found that water-soluble carbonates and bicarbonates accelerate the cure of phenol-aldehyde resins, thereby reducing the amount of time required to cure the resin.

This discovery means that print and overlay sheets impregnated with an accelerated melamine-aldehyde resin can be used with a core stock impregnated with the accelerated phenol-aldehyde resin to produce a laminate in about 10% less time than a control laminate prepared from an NaOH-catalyzed phenol-aldehyde resin. As a result, the heated laminating press can be utilized more efficiently and production through-put increased.

In addition, quite unexpectedly, it has been found that laminates produced with the accelerated resins are more resistant to attack by moisture, as demonstrated by water-boil tests.

BRIEF DESCRIPTION OF THE DRAWINGS

In FIG. 1 a laminate 1 is composed of a melamine-aldehyde impregnated overlay sheet 2, a melamine-aldehyde impregnated print sheet 3, and a phenolic core 4 of several sheets, typically seven, of phenol-aldehyde impregnated paper 5.

DESCRIPTION OF THE INVENTION

Figure 1:
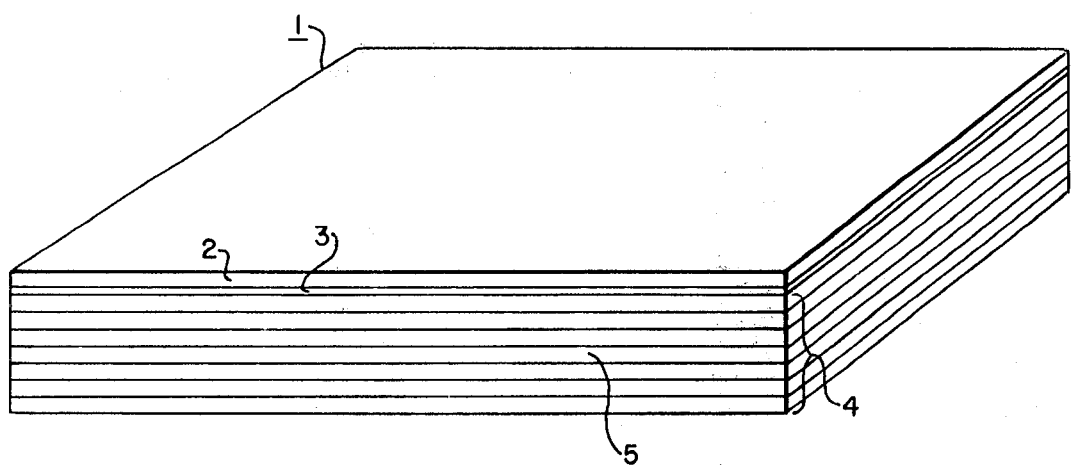
FIG. 1 is an isometric view in section of a certain presently preferred embodiment of a laminate according to this invention.

A composition is prepared of a phenol and an aldehyde in a molar ratio of about 1.15 to about 2.0, about 0.0002 to about 0.01 phr (parts per hundred parts resin, where "resin" refers to the weight of phenol plus aldehyde) of a carbonate or bicarbonate catalyst, and about 5 to about 100 phr of a solvent for the catalyst and for the resulting resin.

Phenols are aromatic compounds with one or more hydroxy groups attached directly to the benzene ring. Example of suitable phenols include the cresols, the xylenols, resorcinol, and the naphthols. Mixtures of phenols may also be used. The preferred phenol is phenol itself (i.e., hydroxybenzene) as it is inexpensive and works well.

Examples of suitable aldehydes include formaldehyde, acetaldehyde, paraformaldehyde, propionaldehyde, furfuraldehyde, benzaldehyde, glyoxal, methyl-glyoxal, etc. Mixtures of aldehydes may also be used. The preferred aldehyde is formaldehyde as it is inexpensive and works well. The formaldehyde is preferably used in the form of formalin, which is about a 37% (all percentages herein are by weight) solution of formaldehyde in 1 to 14% methanol and 49 to 62% water, (the methanol and water being calculated as "solvent").

Examples of suitable catalysts include the alkali metal carbonates and bicarbonates and ammonium carbonate and bicarbonate. Sodium carbonate is preferred as it has been found to work very well. The preferred amount of catalyst is about 0.004 to about 0.008 phr as too much catalyst decreases water resistance and causes low resin yield. Also, if coated on paper a resin with too high a level of catalyst causes the laminate to become brittle, and too little catalyst produces a soft, undercured laminate which gains weight or delaminates in a water-boil test. The carbonate or bicarbonate supplants other catalysts such as NaOH, and preferably other catalysts are not included as they decrease water resistance and extend the cure cycle although small amounts may be used if desired.

Examples of suitable solvents for the catalyst and the resulting resin include water, formaldehyde, phenol, methanol, other low molecular weight alcohols, ether, and tetrahydrofuran. The preferred solvent is a mixture of about 1 to about 25% methanol and about 75 to about 99% water. This mixture is preferred because it is an excellent but inexpensive solvent and tends to act as an exotherm control during resin preparation. The preferred amount of solvent is about 15 to about 50 phr as this amount usually produces a solution which dissolves the phenol, aldehyde, and catalyst, and which is neither too thin nor too thick to work with easily. After resin preparation, sufficient water, alcohol, or water-alcohol blends may be used to decrease viscosity. To facilitate paper treating, the amount added is such that final solids are generally 30 to 40%.

The resin composition may also contain up to about 10 phr urea to lower the cost but this is not preferred because it tends to decrease water resistance as well as reduce the yield. That is, since the urea does not react quantitatively the resultant solid is reduced from the theoretical level.

The composition is heated, preferably to reflux, to produce at least about 95% conversion. With a solvent which is principally water this requires about 1 to 1½ hours at about 90° to 105°C. The per cent conversion is determined experimentally prior to actual production by refluxing samples of the composition for various periods of time, then determining the percent solids in the sample. The amount of reflux time required to achieve at least 95% conversion of the theoretical solids is noted, and the scale-up production run is terminated after that length of time. An explanation of the calculations involved in determining theoretical yield is given in the examples.

While the heated composition may be cooled and stored for use later, it is generally most convenient to cool it to room temperature and apply it directly to a substrate. The application may be by spraying, painting, or other means, but the preferred method is by dipping the substrate in a bath of the liquid composition. The substrate is preferably coated to a ratio of coated substrate to uncoated substrate of about 1.1 to about 2.5.

The substrate may be of any type of paper or woven or matted cloth which will absorb or adsorb the composition. Suitable examples include kraft paper, alpha cellulose paper, any colored or printed paper, cotton cloth, glass cloth, synthetic cloth such as polyethylene terephthalate cloth, etc. The preferred substrate for the phenolic resin is kraft papers as they are relatively inexpensive and easy to work with. The thickness of the substrate is generally about 0.5 to about 20 mils as this range is sufficiently thick to hold the desired amount of composition but is not so thick that the composition is not completely absorbed. The preferred thickenss of the kraft paper is about 10 to about 15 mils. The substrate is generally taken from a roll about 4 to about 60 inches wide but width is limited by paper manufacturing techniques, paper treating equipment, and pressing capacity.

After the substrate is coated with the composition it is partially dried to remove any remaining solvent and to partially cure the resin. This may be accomplished by passing it through a drying oven at about 100° to 325°F. After about 5 to 15 minutes at 150°F the resin is usually dry and non-blocking (i.e., not sticky) and the paper can be cut and stacked. The phenolic-treated substrates to be used next to the melamine-aldehyde substrate preferably have a resin to substrate ratio of 1.1 to 1.5 and volatile content of about 3.5 to about 7%. The remaining phenolic-treated sheets have a resin-to-paper ratio of 1.3 to 2.5 and a volatile content of about 7.0 to about 10.5%. The lower resin and volatile content of the substrates next to the melamine-aldehyde substrate is desired to decrease the bleeding of phenol-aldehyde resin into the melamine-aldehyde resin. The partiallly dried, resin coated substrate can be stored on rolls or cut into sheets of the desired size and stored for use.

After cutting, the phenolic-treated sheets are then stacked with at least one sheet of print paper coated with an accelerated melamine-aldehyde resin. The melamine-aldehyde resin must be an accelerated resin or it will not cure completely in the shortened cure time allowed for the phenolic-aldehyde resin coated substrate. The melamine-aldehyde resin should also be pre-selected to have about the same cure time as the phenolic-aldehyde resin so that neither resin is over-cured or undercured. The stack (of several laminates separated by metal spacers and release paper) is heated in a press to a maximum temperature of about 300 to about 350°F. A temperature of about 250° to about 330°F is suitable and about 250° to about 275°F is preferred. The stack is heated under a pressure of about 800 to about 1200 psi (preferably about 1000 to about 1200 psi) for about 25 to about 60 minutes.

The finished decorative laminate is typically abraded on the phenolic surface, bonded to a heavier board and used as a surface for tables, furniture, etc.

The following examples further illustrate this invention.

EXAMPLE

The following compositions were prepared in 1-liter glass reactors fitted with stirrer, condenser, thermometer, and entry port, and were refluxed for one-half hour:

|  | A | B | C | D | E | F | G | H | I |
|---|---|---|---|---|---|---|---|---|---|
| Phenol | 300 | 300 | 300 | 300 | 300 | 300 | 300 | 300 | 300 |
| CH$_2$O (37%) | 315 | 335 | 362 | 372 | 388 | 388 | 414 | 414 | 440 |
| Na$_2$CO$_3$ | 3 | 3 | 3 | 3 | 3 | 3 | 3 | 3 | 3 |
| F/P Mole Ratio | 1.22 | 1.30 | 1.40 | 1.44 | 1.50 | 1.50 | 1.60 | 1.60 | 1.70 |
| Moles Na$^+$/Moles Phenol × 10$^2$ | 1.77 | 1.77 | 1.77 | 1.77 | 1.77 | 1.77 | 1.77 | 1.77 | 1.77 |
| % Solids Theoretical | 56.2 | 54.5 | 53.4 | 52.8 | 51.8 | 51.8 | 49.2 | 49.2 | 48.9 |
| % Solids Experimental | 45.5 | 47.1 | 47.6 | 42.9 | 45.4 | 44.6 | 46.2 | 42.0 | 41.3 |
| % Yield of Theory | 81.0 | 86.5 | 89.1 | 81.5 | 87.5 | 86.5 | 93.5 | 85.5 | 84.5 |
| % Water Dilutability | 495 | 380 | 420 | 620 | 510 | 560 | 500 | 615 | 640 |
| % Free CH$_2$O | 1.82 | 2.62 | 3.33 | 3.44 | 4.30 | 3.59 | 4.57 | 4.23 | 5.18 |

The following compositions were similarly prepared but were refluxed for 1 hour:

|  | J | K | L | M | N | P | Q | R | S | T | U |
|---|---|---|---|---|---|---|---|---|---|---|---|
| Phenol | 300 | 300 | 300 | 300 | 300 | 300 | 300 | 300 | 300 | 300 | 300 |
| CH$_2$O (37%) | 315 | 326 | 335 | 335 | 350 | 360 | 362 | 374 | 388 | 414 | 440 |
| Na$_2$CO$_3$ | 3 | 3 | 3 | 3 | 3 | 3 | 3 | 3 | 3 | 3 | 3 |

—Continued

|  | J | K | L | M | N | P | Q | R | S | T | U |
|---|---|---|---|---|---|---|---|---|---|---|---|
| F/P Mole Ratio | 1.22 | 1.26 | 1.30 | 1.30 | 1.35 | 1.39 | 1.40 | 1.45 | 1.50 | 1.60 | 1.70 |
| Mole $Na^+$/Mole Phenol $\times 10^2$ | 1.77 | 1.77 | 1.77 | 1.77 | 1.77 | 1.77 | 1.77 | 1.77 | 1.77 | 1.77 | 1.77 |
| % Solids, Theoretical | 56.2 | 55.5 | 54.5 | 54.5 | 54.1 | 53.4 | 53.4 | 52.8 | 51.8 | 50.4 | 48.9 |
| % Solids, Experimental | 51.9 | 51.2 | 51.0 | 51.6 | 52.6 | 50.5 | 51.3 | 50.1 | 50.9 | 49.4 | 48.7 |
| % Yield of Theory | 92.5 | 92.3 | 93.5 | 94.5 | 97.3 | 95.7 | 96 | 95.5 | 98.2 | 98.0 | 99.5 |
| % Water Dilutability | 155–160 | 145 | 150 | 170 | 155–160 | 150 | 130–135 | 180 | 145–150 | 145–150 | 180–185 |
| % Free $CH_2O$ [a] | 1.09 | 1.30 | 1.45 | 1.77 | 1.82 | 159 | 2.05 | 2.25 | 2.76 | 2.68 | 3.91 |

[a]-Hydroxylamine hydrochloride technique.

The following control compositions were similarly prepared and were refluxed for 1 hour:

|  | V | W | X | Y | Z |
|---|---|---|---|---|---|
| Phenol | 300 | 300 | 300 | 300 | 300 |
| $CH_2O$ (37%) | 315 | 335 | 362 | 388 | 414 |
| NaOH | 2.6 | 2.6 | 2.6 | 2.6 | 2.6 |
| F/P Mole Ratio | 1.22 | 1.30 | 1.40 | 1.50 | 1.60 |
| Moles $Na^+$/Moles Phenol $\times 10^2$ | 2.03 | 2.03 | 2.03 | 2.03 | 2.03 |
| % Solids, Theoretical | 56.2 | 54.5 | 53.4 | 51.8 | 49.2 |
| % Solids, Experimental | 49.5 | 49.7 | 49.0 | 48.5 | 47.0 |
| % Yield of Theory | 88.1 | 91.5 | 91.7 | 93.5 | 95.5 |
| % Water Dilutability | 185 | 210 | 207 | 195 | 200 |
| % Free $CH_2O$ | 0.07 | 1.02 | 1.48 | 1.98 | 2.52 |

Percent solids given in the tables were determined by weighing the amount of residue remaining after a pre-weighed quantity of resin (1–2 gms) was cured for 2 hours at 130°C on 10 gms of sand in an aluminum weighing dish. Based on the percent solids determination and the theoretical amount of solids anticipated from a known reaction mixture, the yield, as a percent of theoretical, was calculated.

The calculation of the theoretical solids yield for the phenolic reaction mixture is based on two assumptions:

1. The cured phenolic resin contains a negligible quantity of "small" resin molecules, i.e., dimers, trimers, tetramers, etc.
2. The phenyl rings are jointed predominantly by methylene-type linkages in the cured resin.

In the calculation of the theoretical solids yield, it is therefore necessary to allow for the loss of one molecule of water per molecule of formaldehyde reacted. One way to treat this calculation is to assume that one mole of formaldehyde effectvely contributes 12 grams to the molecular weight of the cured resin structure, the other two grams for a $—CH_2—$ linkage being allowed for due to loss of H from two adjacent phenol molecules. The net result is that only 14.8% of the formaldehyde solution contributes to the solids yield.

A sample calculation of theoretical solids yield will serve to illustrate:

| Reactant | Amount | Percent Contribution to Solids Yield | Theoretical Resin Solids |
|---|---|---|---|
| Phenol | 3000 lbs. | 100 % | 3000 lbs. |
| 37% $CH_2O$ | 3150 | 14.8% | 466 |
| NaOH | 10 | 57.5% | 5.5 |
| $H_2O$ | 1230 | 0 | 0 |
| $CH_3OH$ | 10 | 0 | 0 |
| (Added after resin preparation) | 7400 lbs. Total Wt. |  | 3471.5 lbs. Total Theoretical Solids |

$$\text{Theoretical Percent Solids} = \frac{3471.5}{7400} \times 100 = 46.9\%$$

Free or unreacted formaldehyde content given in the preceding tables was determined by the hydroxylamine hydrochloride method. Formaldehyde, present as a hemiformal of the methylol phenols, disassociates and is also titrated as free formaldehyde by this method.

Water dilutability given in the preceding tables is a technique for determining the tolerance of a resin to the addition of water. It is related to the degree of resin condensation and is based on the fact that as the condensation increases the water dilutability decreases. The water dilutability of a resin is related to the solids content and resin storage stability. Water dilutability was determined by adding water to a premeasured quantity of resin (usually 10 mls) in a graduated cylinder until the resin precipitated. The volume of water added was divided by the volume of sample to obtain the water dilutability value or $$\frac{\text{Total volume} - \text{volume of sample}}{\text{Volume sample}} \times 100 = \% \text{ water dilutability}$$

The water dilutability of the resins prepared with laborabory grade formaldehyde was abnormally high due to the 10–15% methanol content in the formaldehyde. Usually formaldehyde for industrial resin manufacture contains less then 1% methanol and the resulting resins possess considerably lower water dilutability. The preceding tables show that using a 1 hour reflux time, the resin yield obtained from sodium carbonate catalyst is consistently higher than that of the sodium hydroxide-catalyzed resins cooked for a similar period of time. Sodium carbonate-catalyzed phenolic resin systems refluxed for one-half hour show a considerably lower resin yield than that obtained with the 1 hour reflux time.

The resins prepared with sodium carbonate catalyst at 1 hour reflux exhibited the least water dilutability (highest degree of condensation). Resins prepared with sodium carbonate catalyst and refluxed for one-half hour showed the highest water dilutability (lowest degree of condensation). Although the yield for the resins prepared with 1 hour reflux using sodium hydroxide was close to the sodium carbonate curve, the water dilutability was slightly higher, since the $Na^+$/phenol mole ratio was $2.0 \times 10^2$ for the sodium hydroxide resin system and somewhat less ($1.77 \times 10^{-2}$) for the sodium carbonate system.

The free formaldehyde content for the one hour reflux with sodium carbonate was slightly less than that found for the one-half hour reflux with carbonate and slightly greater than that found for 1 hour reflux with the hydroxide system.

After dilution to 30–40% solids with a mixture of methanol and water, all phenolic resins prepared (except the control) were hand-dipped on kraft paper to a coating ratio (i.e., weight of a unit area of resin treated paper/ weight of the same unit area of untreated paper, with a specified volatile and greenness level) of about 1.50 and a percent volatiles (i.e., percent weight loss from a 6 inch ×6 inch sheet of treated paper upon heating 10 minutes at 302°F) level of close to 5% after dilution to about 30% solids. The NaOH-catalyzed control resins were machine-dipped and hence are more uniform regarding coating parameters. Resin coating parameters are shown in the following table for the sodium carbonate resins. Considerable difficulty was encountered in controlling the coating ratios with an all-water diluted resin system, and drying to the desired volatile content took 2 to 3 times as long as the alcohol/water-diluted control resin. However, when alcohol/water mixtures were used to dilute the $Na_2CO_3$-catalyzed resins to appropriate coating solids the paper drying time was very similar to the required for the sodium hydroxide-catalyzed control resin.

RESIN DESIGNATION

|  | A | B | C | D | E | F | G | H | I | J | K |
|---|---|---|---|---|---|---|---|---|---|---|---|
| F/P Ratio | 1.22 | 1.26 | 1.30 | 1.30 | 1.35 | 1.39 | 1.40 | 1.40 | 1.45 | 1.50 | 1.60 | 1.70 |
| Paper-Treating Ratio | 1.57 | 1.56 | 1.55 | 1.55 | 1.50 | 1.57 | 1.53 | 1.40 | 1.56 | 1.56 | 1.49 | 1.52 |
| No. Volatile | 4.80 | 5.05 | 5.17 | 5.00 | 5.27 | 6.90 | 5.93 | 5.40 | 3.90 | 4.10 | 6.35 | 6.50 |

Five inch by eight inch laminates were plied-up using seven phenolic-treated core sheets, one accelerated melamine-aldehyde resin and one layer of an accelerated melamine-aldehyde treated α-cellulose paper (see application Ser. No. 363,775).

Adopted as standard procedure was the simultaneous preparation of two laminates—one using sodium hydroxide-catalyzed phenolic resin and one using sodium carbonate-catalyzed phenolic resin—with a layer of mold release treated aluminum foil separating the two boards.

A thermocouple was inserted in the middle of the two board pack to monitor cure temperature. The laminates were cured for 10 minutes at 300°F and 1000 psi, cooled to about 100°F, and demolded.

The melamine-treated print and α-cellulose papers were used as a uniform decorative surface for laminates prepared from sodium carbonate and sodium hydroxide-catalyzed phenolic core stocks.

After molding, the laminates were cut into pieces about 1 inch ×3 inches, the edges sanded lightly, weighed, and the thickness measured to the nearest 0.001 inch. The individual pieces were boiled in water for a period of 2 hours and the percent weight-gain and thickness-increase computed according to NEMA test LDI-1964.

Figure 2:
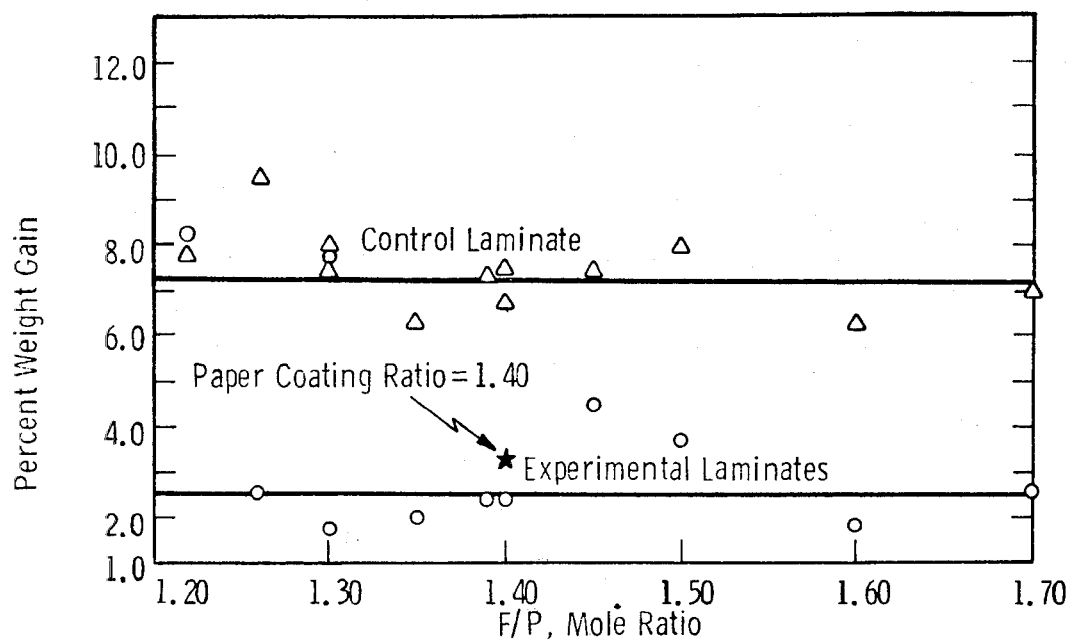
FIG. 2 is a graph comparing the thickness increase of the laminates of this invention with prior laminates (i.e., laminates prepared from phenolic resins catalyzed with NaOH) after a water-boil test.
Figure 3:
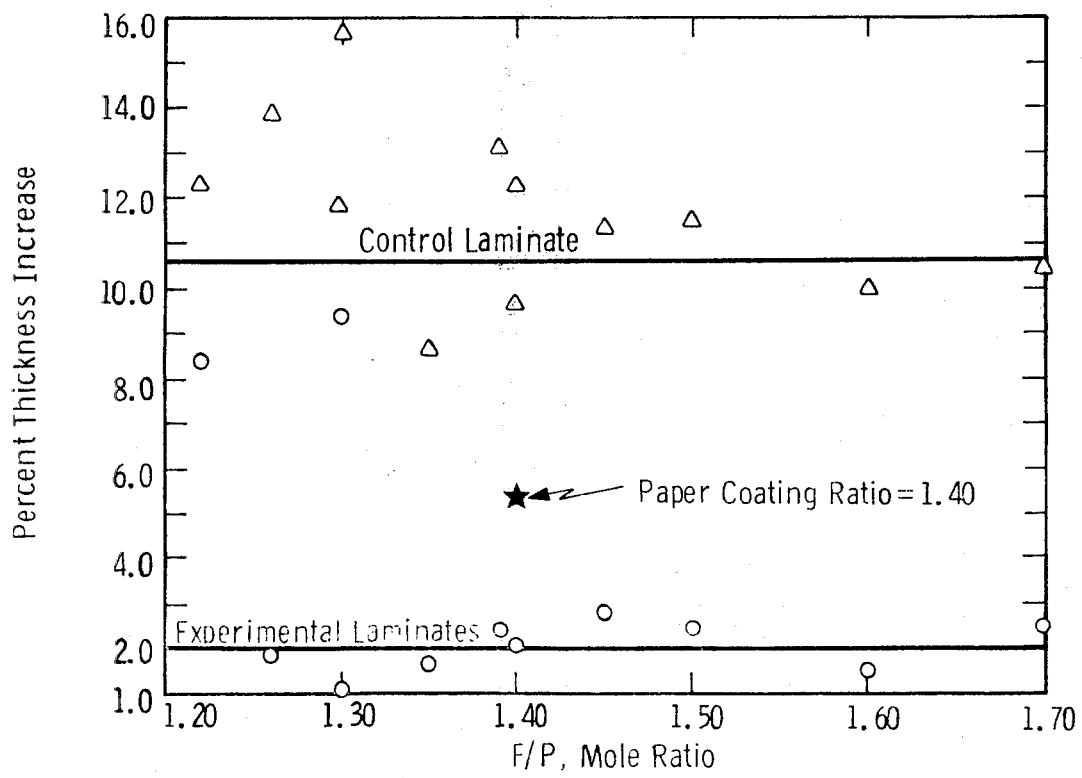
FIG. 3 is a graph comparing the weight gain of the laminates of this invention with prior laminates after a water-boil test.

The percent weight-gain and thickness-increase data for the laminates prepared from various resins are summarized in FIGS. 2 and 3. The paper-treating ratio for the sodium carbonate-catalyzed laminates is somewhat higher than that of the sodium hydroxide-catalyzed laminates. However, in one case where a paper-treating ratio of 1.40 was attained for both the sodium carbonate-catalyzed laminate and the sodium hydroxide-catalyzed laminate, the weight-gain and thickness-increase of the carbonate-catalyzed laminate were still lower than those of the sodium hydroxide-catalyzed laminate. Water-boil data, graphically presented in FIGS. 2 and 3, contrast the response for sodium hydroxide and sodium carbonate-catalyzed laminates and clearly demonstrate the superiority of resins prepared with the sodium carbonate catalyst when laminated under the same conditions of temperature and pressure. The weight-gain and thickness-increase data shows that the laminates of this invention were cured to a greater degree than the NaOH-catalyzed control laminate in the same period of time. Alternatively, the data indicates that the laminates of this invention will cure to same degree as the control laminates in a shorter period of time.

The gross dimensional change of the experimental ($Na_2CO_3$-catalyzed phenolic resin) laminates was found to be equivalent to the gross dimensional change of the control (NaOH-catalyzed phenolic resin) laminates and well within our NEMA standards (i.e., National Electrical Manufacturers Association Standards LDI-2.08, 1971).

I claim as my invention:

1. A method of making a laminate comprising:
   1. preparing a composition which comprises:
      A. a phenol and an aldehyde in a molar ratio of about 1.15 to about 2.0;
      B. about 0.0002 to about 0.01 phr of a catalyst selected from the group consisting of water-soluble carbonates, water-soluble bicarbonates, and mixtures thereof; and
      C. About 5 to about 100 phr of a solvent for said catalyst and for the resin produced by reaction of said phenol with said aldehyde;
   2. heating said composition to convert said composition to at least about 95% of theoretical solids;
   3. coating sheets of a first substrate with said composition to a ratio of coated substrate to uncoated substrate of about 1.1 to about 2.5;
   4. partially drying said coated substrate;
   5. forming a stack of said coated substrates;
   6. placing on said stack at least one sheet of a second substrate coated with an accelerated resin consisting essentially of melamine and an aldehyde and containing about 0.001 to about 2% (based on resin solids) of a free-radical generator, said resin having about the same cure time as said phenol-aldehyde resin; and 7. curing the resins in said stack at an accelerated rate by heating said stack under pressure.

2. A method according to claim 1 wherein said catalyst is sodium carbonate.

3. A method according to claim 1 wherein said solvent is about 1 to about 25% methanol and about 75 to about 99% water and the amount of said solvent is about 15 to about 50 phr.

4. A method according to claim 1 wherein the amount of said catalyst is about 0.004 to about 0.008 phr.

5. A method according to claim 1 wherein said phenol is hydroxybenzene and said aldehyde is formaldehyde.

6. A method according to claim 5 wherein said formaldehyde is in the form of formalin.

7. A method according to claim 1 wherein prior to curing, sheets of said first substrate which are next to a sheet of said second substrate have a resin to substrate ratio of about 1.1 to about 1.5 and a volatile content of about 3.5 to about 7.0% and sheets of said first substrate farther away from said sheet of said second substrate have a resin to substrate ratio of about 1.3 to about 2.5 and a volatile content of about 7.0% to about 10.5%.

8. A method according to claim 1 wherein said first substrate is kraft paper.

9. A method according to claim 1 wherein said curing is done at about 250° to about 330°F and about 800 to about 1200 psi for about 25 to about 60 minutes.

10. A laminate made according to the method of claim 1.

* * * * *